US 6,635,378 B1

(12) United States Patent
Yang et al.

(10) Patent No.: US 6,635,378 B1
(45) Date of Patent: Oct. 21, 2003

(54) FUEL CELL HAVING IMPROVED CONDENSATION AND REACTION PRODUCT MANAGEMENT CAPABILITIES

(75) Inventors: Jefferson Y. S. Yang, Orange, CA (US); Gareth Dominick DeSanctis, Los Angeles, CA (US); Gordon Roy Woodcock, Hermosa, CA (US); Joseph Timothy Rehg, Rancho Palos Verdes, CA (US)

(73) Assignee: Hybrid Power Generation System, LLC, Los Angeles, CA (US)

( * ) Notice: Subject to any disclaimer, the term of this patent is extended or adjusted under 35 U.S.C. 154(b) by 0 days.

(21) Appl. No.: 09/375,073

(22) Filed: Aug. 16, 1999

(51) Int. Cl.⁷ .................................................. H01M 8/04
(52) U.S. Cl. ............................. 429/34; 429/38; 429/39
(58) Field of Search ................................ 429/34, 38, 39

(56) References Cited

U.S. PATENT DOCUMENTS

| | | | |
|---|---|---|---|
| 5,277,994 A | 1/1994 | Sprouse | |
| 5,306,577 A | 4/1994 | Sprouse | |
| 5,366,818 A | 11/1994 | Wilkinson et al. | |
| 5,376,470 A | 12/1994 | Sprouse | |
| 5,407,756 A | 4/1995 | Sprouse | |
| 5,506,066 A | 4/1996 | Sprouse | |
| 5,510,202 A | 4/1996 | McCoy | |
| 5,514,487 A * | 5/1996 | Washington et al. | 429/39 |
| 5,534,363 A | 7/1996 | Sprouse et al. | |
| 5,549,983 A | 8/1996 | Yamanis | |
| 5,776,624 A | 7/1998 | Neutzler | |
| 5,776,625 A | 7/1998 | Kaufman et al. | |
| 5,798,187 A | 8/1998 | Wilson et al. | |
| 6,017,648 A * | 1/2000 | Jones | 429/35 |
| 6,087,028 A * | 7/2000 | Goto | 429/24 |

FOREIGN PATENT DOCUMENTS

| | | |
|---|---|---|
| JP | 61-128469 | 6/1986 |
| JP | 63-86270 | 4/1988 |
| JP | 1-173576 | 7/1989 |
| JP | 2-117069 | 5/1990 |
| JP | 5-94831 | 4/1993 |
| JP | 6-188002 | 7/1994 |
| JP | 6-267559 | 9/1994 |
| JP | 7-161366 | 6/1995 |
| JP | 8-180883 | 7/1996 |
| JP | 10-172594 | 6/1998 |
| WO | WO 97/21256 | 6/1997 |

OTHER PUBLICATIONS

English Language Patent Abstract for Japanese App. No. 63269405 (Publication No. 2–117069, May 1, 1990).
English Language Patent Abstract for Japanese App. No. 62329758 (Publication No. 1–173576, Jul. 10, 1989).
English Language Patent Abstract for Japanese App. No. 05054395 (Publication No. 6–267559, Sep. 22, 1994).
English Language Patent Abstract for Japanese App. No. 08325039 (Publication No. 10–172594, Jun. 26, 1998).
English Language Patent Abstract for Japanese App. No. 59249590 (Publication No. 61–128469, Jun. 16, 1986).
English Language Patent Abstract for Japanese App. No. 05339863 (Publication No. 7–161366, Jun. 23, 1995).
English Language Patent Abstract for Japanese App. No. 03283503 (Publication No. 5–94831, Apr. 16, 1993).
English Language Patent Abstract for Japanese App. No. 61228177 (Publication No. 63–86270, Apr. 16, 1988).

(List continued on next page.)

Primary Examiner—Gabrielle Brouillette
Assistant Examiner—Jonathan Crepeau
(74) Attorney, Agent, or Firm—Sutherland Asbill & Brennan LLP

(57) ABSTRACT

A fuel cell bipolar plate including a plurality of reactant channels defining respective inlets and outlets and at least two flow restrictors respectively associated with at least two adjacent reactant channels.

5 Claims, 5 Drawing Sheets

OTHER PUBLICATIONS

English Language Patent Abstract for Japanese App. No. 04336114 (Publication No. 6-188002, Jul. 8, 1994).

English Language Patent Abstract for Japanese App. No. 06321138 (Publication No. 8-180883, Jul. 12, 1996).

* cited by examiner

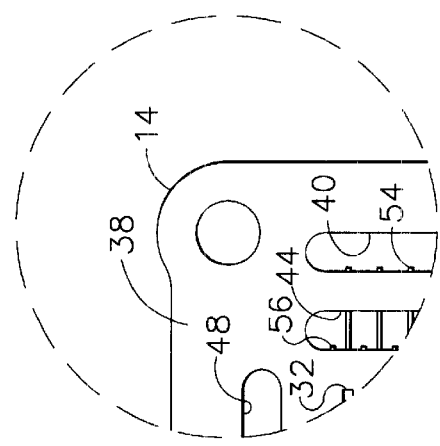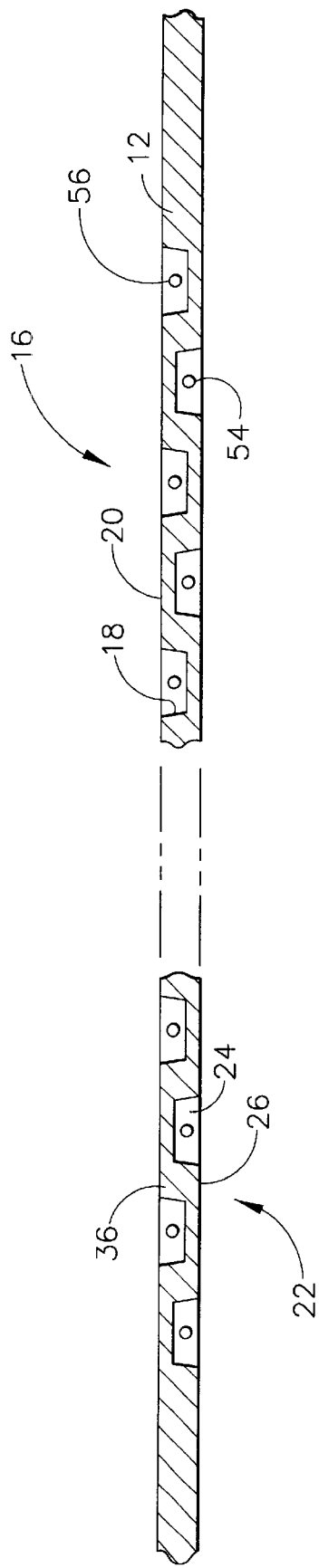

FUEL CELL HAVING IMPROVED CONDENSATION AND REACTION PRODUCT MANAGEMENT CAPABILITIES

The Government of the United States of America may have a paid-up license in the inventions disclosed herein and the right in limited circumstances to require the patent owner to license others on reasonable terms.

BACKGROUND OF THE INVENTIONS

1. Field of Inventions

The present inventions relate generally to fuel cells and, more specifically, to the management of condensation and reaction product within fuel cells.

2. Description of the Related Art

A fuel cell converts fuel and oxidant (collectively "reactants") into electricity and a reaction product. Many fuel cells employ hydrogen as the fuel and oxygen as the oxidant. Here, the reaction product is water. One such fuel cell is the proton exchange membrane (PEM) fuel cell. Each individual cell in a PEM fuel cell includes an anode and a cathode separated by a thin, ionically conducting membrane, which together are often referred to as a membrane electrode assembly (MEA). The anode and cathode, on opposing faces of the ionically conducting membrane, are comprised of a thin catalyst containing film and a gas diffusion layer. Hydrogen is supplied to the anode and oxygen supplied to the cathode. The gas diffusion layer insures that hydrogen is effectively transported to the anode catalyst and that oxygen is effectively transported to the cathode catalyst. The hydrogen is electrochemically oxidized at the anode catalyst, thereby producing protons that migrate across the conducting membrane and react with the oxygen at the cathode catalyst to produce water. The individual MEAs are stacked in electrical series with impermeable electrically conductive bipolar plates therebetween that conduct current between the anode of one MEA and the cathode of the adjacent MEA. The bipolar plates have channels formed on one side for transporting fuel over one MEA and channels formed on the other side for transporting oxidant over an adjacent MEA. The reactants, such as hydrogen and oxygen, are pumped through the channels from respective inlet manifolds to respective outlet manifolds.

Fuel cells are considered an attractive energy source for a variety of reasons. As compared to batteries, fuel cells are advantageous in that they can maintain a specific power output as long as fuel is continuously supplied and are not hampered by a charge/discharge cycle. Fuel cells are also relatively small and lightweight and produce virtually no environmental emissions. PEM fuel cells are particularly advantageous because they have relatively low operating temperatures and employ a non-liquid, non-corrosive electrolyte.

Despite these advantages, conventional fuel cells are susceptible to improvement. For example, reaction products such as water can accumulate within the channels and block reactant flow. Humidity in the reactants can also condense and accumulate within the channels. Conventional fuel cells seek to clear reaction products and condensed humidity from the channels by creating a pressure differential (or drop) between the inlet manifolds and the outlet manifolds. A desirable pressure differential is one that is sufficiently large to prevent reaction products and/or condensate from accumulating in one or more of the channels of the bipolar plate. The requisite pressure drop, which depends on a number of factors including fuel cell operating conditions (i.e. flow rate and temperature), the material and construction of the bipolar plate channels, and channel geometry, is typically between a few inches of water and 15 PSI.

Pressure is reduced in conventional fuel cells by the effects of wall friction as the reactants move through the channels. More specifically, the conventional method of creating a sufficient wall friction-based pressure differential is to make the reactant channels in the bipolar plates long and tortuous or of a small hydraulic diameter. Alternatively, the reactant flow rates can be increased in order to create greater frictional losses and pressure drops.

The inventor herein has determined that the long, tortuous reactant flow channel method of creating a pressure differential is less than optimal. For example, although it is important that the pressure differential be uniform from channel to channel to insure uniform reactant flow, it is difficult and expensive to create a series of long, tortuous channels of equal length. There are also instances where the use of long, tortuous channels is either impracticable or impossible. For example, hexagonal bipolar plates often include z-shaped flow channels which are not particularly long or tortuous. The geometry of a hexagonal bipolar plate requires the long, tortuous channels to be too far apart to achieve acceptable diffusion of the reactants into the gas diffusion electrode. As such, it is difficult to obtain the requisite pressure differential using conventional long, tortuous channels. In addition, recent advances in bipolar plate technology have resulted in relatively straight reactant flow channels. One such bipolar plate is disclosed in concurrently filed commonly assigned application Ser. No. 09/375,072, now U.S. Pat. No. 6,322, 919, entitled "Fuel Cell and Bipolar Plate For Use With Same," which is incorporated herein by reference.

The inventor herein has also determined that creating a pressure differential through the use of reactant channels with a small hydraulic diameter is less than optimal. The use of small hydraulic diameter reactant channels requires very tight manufacturing tolerances because without the tight tolerances friction can vary from channel to channel, which results in non-uniform reactant flow. Accordingly, although bipolar plates having small hydraulic diameters are available, their manufacture requires the use of relatively laborious and expensive manufacturing processes.

The inventor herein has also determined that increasing reactant flow rates is a less than optimal method of creating pressure differentials. Increasing the fuel flow rate results in wasted fuel, thereby reducing the efficiency of the fuel cell. Increasing the oxidant flow rate further reduces the efficiency of the fuel cell because of the additional power that is required by the associated compressor or fan.

SUMMARY OF THE INVENTIONS

Accordingly, one object of the present inventions is to provide a fuel cell that is capable of clearing reaction products and condensed humidity from the reactant channels. Another object of the present invention is to provide a bipolar plate assembly that creates a sufficient pressure differential between the inlet and outlet manifolds to clear reaction products and condensed humidity from the reactant channels without resorting to long, tortuous channels. Still another object of the present invention is to provide a bipolar plate assembly that creates a sufficient pressure drop between the inlet and outlet manifolds to clear reaction products and condensed humidity from reactant channels without resorting to small hydraulic diameter channels. Yet another object of the present invention is to provide a bipolar plate assembly that creates a uniform pressure differential from channel to channel and plate to plate.

In order to accomplish some of these and other objectives, a bipolar plate assembly in accordance with a preferred embodiment of a present invention includes a plurality of reactant channels defining respective inlets and outlets, the inlets of adjacent channels being adjacent one another and the outlets of adjacent channels being adjacent one another, and at least two flow restrictors respectively associated with at least two adjacent reactant channels. In one implementation, the inlets are associated with a common inlet manifold and the outlets are associated with a common outlet manifold.

The present inventions provide a number of advantages over conventional bipolar plates and fuel cells. For example, the flow restrictors create a pressure drop sufficient to clear reaction product and condensed humidity from the channels, thereby eliminating the need for the long, tortuous channels, channels of small hydraulic diameter, and excessive flow rates that create the pressure drop in conventional fuels cells. It is also relatively easy to fabricate uniformly sized flow restrictors, which results in uniform pressure differentials and uniform reactant flow through the channels without the difficulty and expense associated with the creation of channels of identical length with tight tolerances.

In those implementations of the present inventions where the inlets and outlets are associated with common inlet and outlet manifolds, the pressure differential will be determined by the flow rate and geometry of the restrictors. Should one channel become blocked, the pressure differential across the manifolds will be substantially unchanged and the pressure drop across the flow restrictor associated with the blocked channel will be zero because there is no flow. Consequently, the pressure drop across the blockage itself will be equal to the pressure drop across the inlet and outlet manifolds. Such a pressure differential will be sufficient to clear all of the channels of reaction product and condensed humidity.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

FIG. 2 is an enlarged view of a portion of the bipolar plate assembly illustrated in FIG. 1.

FIG. 3 is a partial section view taken along line 3—3 in FIG. 1.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions.

Figure 1:
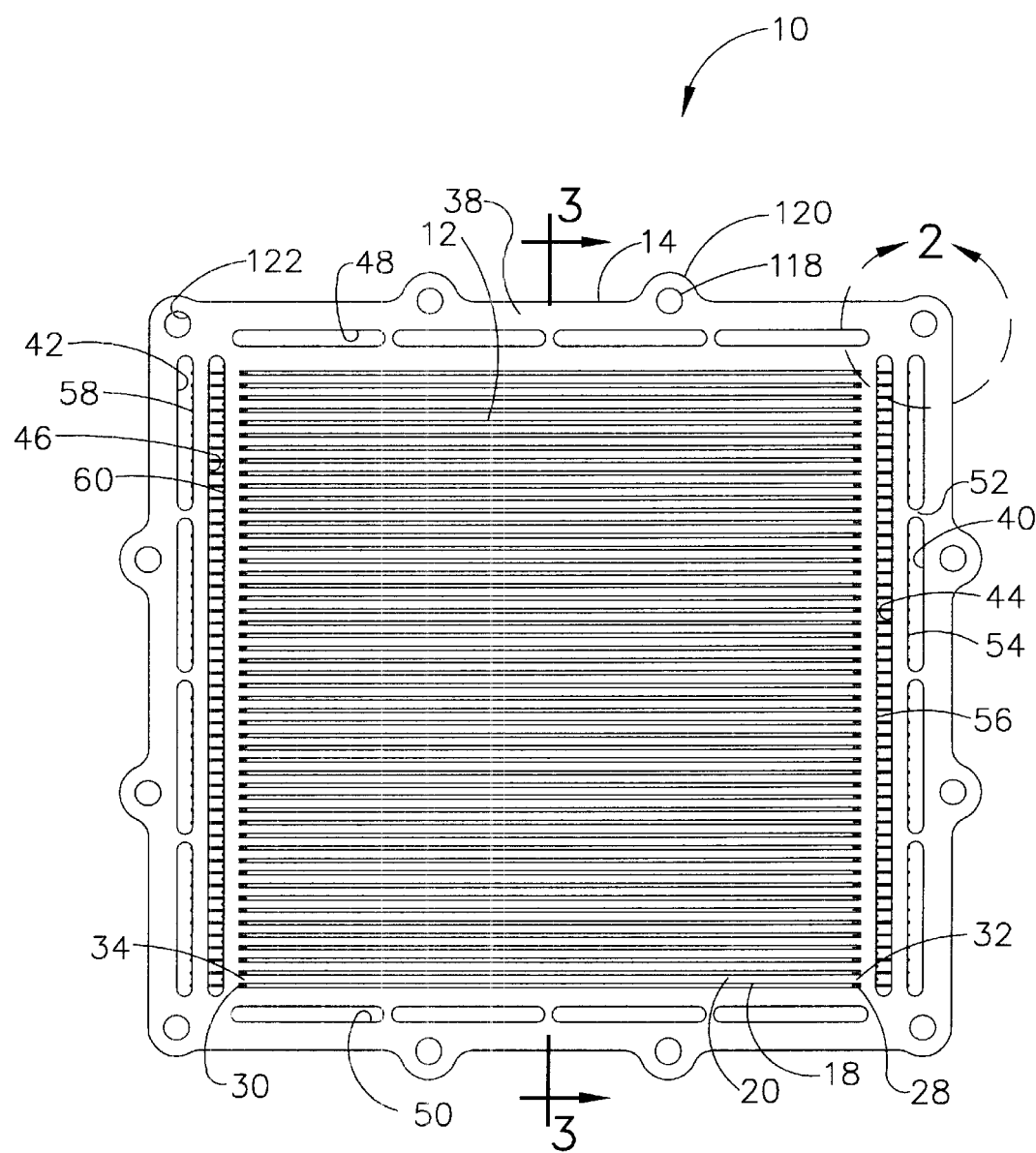
FIG. 1 is a plan view of a bipolar plate assembly in accordance with a preferred embodiment of a present invention.

As illustrated for example in FIGS. 1–3, a bipolar plate assembly 10 in a accordance with a preferred embodiment of a present invention includes a bipolar plate 12 and a frame 14. The bipolar plate 12 and frame 14 may be separate structural elements that are welded, glued or otherwise mechanically fastened to one another, as is shown, or formed as an integral unit. The exemplary bipolar plate 12 includes an oxidant side 16, having an alternating series of oxidant channels 18 and oxidant side ridges 20, and a fuel side 22 having an alternating series of fuel channels 24 and fuel side ridges 26. The oxidant channels 18 include inlets 28 and outlets 30 and the fuel channels include inlets 32 and outlets 34. Adjacent channels are separated by side walls 36. The exemplary frame 14 includes a frame member 38 that extends around the periphery of the bipolar plate 12. Fuel inlet and outlet manifolds 40 and 42, oxidant inlet and outlet manifolds 44 and 46, and coolant inlet and outlet manifolds 48 and 50 are formed in the frame member 38. Each of the manifolds preferably includes a plurality of strengthening members 52.

As shown by way of example in FIG. 2, the exemplary bipolar plate 12 has a corrugated construction. There is essentially no overlap between adjacent oxidant channels 18 and fuel channels 24. The corrugated construction, which results in a compact and light bipolar plate, is discussed in greater detail in the aforementioned application entitled "Fuel Cell and Bipolar Plate For Use With Same." Additionally, although other configurations may be employed, each channel is substantially trapezoidally-shaped in cross-section. A substantially square-shaped cross-section could alternatively be employed as could a cross-section that is partially or completely curved. Nevertheless, for best current collection, the ridges 20 and 26 (which will be in contact with the MEAs) should be substantially flat in order to maximize the contact area for current collection.

Flow restrictors, which create a pressure differential between the inlet manifolds 40 and 44 and outlet manifolds 42 and 46, are associated at least some, and preferably all, of the channels 18 and 24. In the exemplary embodiment illustrated in FIGS. 1–3, the flow restriction is accomplished through the use of fuel inlet tubes 54, which pass through the frame member 38 and connect the fuel inlet manifold 40 to the fuel channel inlets 32, and oxidant inlet tubes 56, which pass through the frame member and connect the oxidant inlet manifold 44 to the oxidant channel inlets 28. Fuel outlet tubes 58 connect the fuel channel outlets 34 to the fuel outlet manifold 42 and oxidant outlet tubes 60 connect the oxidant channel outlets 30 to the oxidant outlet manifold 46. The cross-sectional (or flow) areas of the inlet tubes 54 and 56 are such that they create a flow restriction and, therefore, a pressure differential between the inlet manifolds and the channel inlets. Although other shapes may be used, the inlet tubes 54 and 56 and outlet tubes 58 and 60 in the illustrated embodiment are round in cross-section and the internal diameter of the outlet tubes is approximately twice that of the inlet tubes. As such, the flow areas of the outlet tubes 58 and 60 are approximately four times that of the inlet tubes 54 and 56 and are large enough that they do not create any appreciable flow restriction.

The flow restrictors (tubes 54 and 56 in the embodiment illustrated in FIGS. 1–3) create a pressure drop sufficient to clear reaction product and condensed humidity from the channels 18 and 24. This eliminates the need for the conventional long, tortuous channels, channels with small hydraulic diameters and excessive flow rates. At least 50%, and preferably all of the pressure drop should occur at the flow restrictors. Moreover, where the channel inlets and outlets are associated with common inlet and outlet manifolds, the pressure differential between the manifolds will be determined by the restrictor geometry and the reactant flow rate. When one channel becomes obstructed with reactant products or condensate, flow in that channel ceases and flow continues in the remaining unblocked channels. The pressure differential between the inlet and outlet manifolds increases because the reactants that normally flow through the blocked channel are now flowing through the remaining unblocked channels. In the blocked channel, there is no pressure differential across the restrictor because there is no flow. Consequently, the pressure differential across the blockage itself is equal to the pressure differential across the inlet and outlet manifolds. Such a pressure differential will be sufficient to: clear any blocked channels of reaction product and condensed humidity. The restrictors are also preferably uniformly sized, which provides uniform pressure differentials and reactant flow through the channels and from plate to plate.

It should be noted that flow restrictors are not limited to the relatively small inlet tube arrangement illustrated in FIGS. 1–3. For example, the cathode plate 62 illustrated in FIGS. 4–6 includes a series of z-shaped channels 64 that extend from the inlet manifold 66 to the outlet manifold 68. Constrictions 70, which are narrower than the z-shaped channels 64, are formed at the inlet end 72 of each channel. In the exemplary embodiment, the cross-sectional area of the constrictions 70 is approximately one-tenth that of the channels 64. The constrictions 70 create a pressure drop in the same manner as the inlet tubes 54 and 56 illustrated in FIGS. 1–3.

Other types of flow restrictors may also be employed. For example, the flow areas of the inlet and outlet tubes could all be large enough that they will not create any appreciable pressure drop. Here, baffles could be located within the channels to act as flow restrictors. Baffles could also be added to the channels in the embodiments illustrated in FIGS. 1–6 in order to increase the pressure differential between the inlet and outlet manifolds. In addition, although the preferred location of the flow restrictors is at or near the inlet end of the reactant channels, the location may be changed as applications require.

Figure 4:
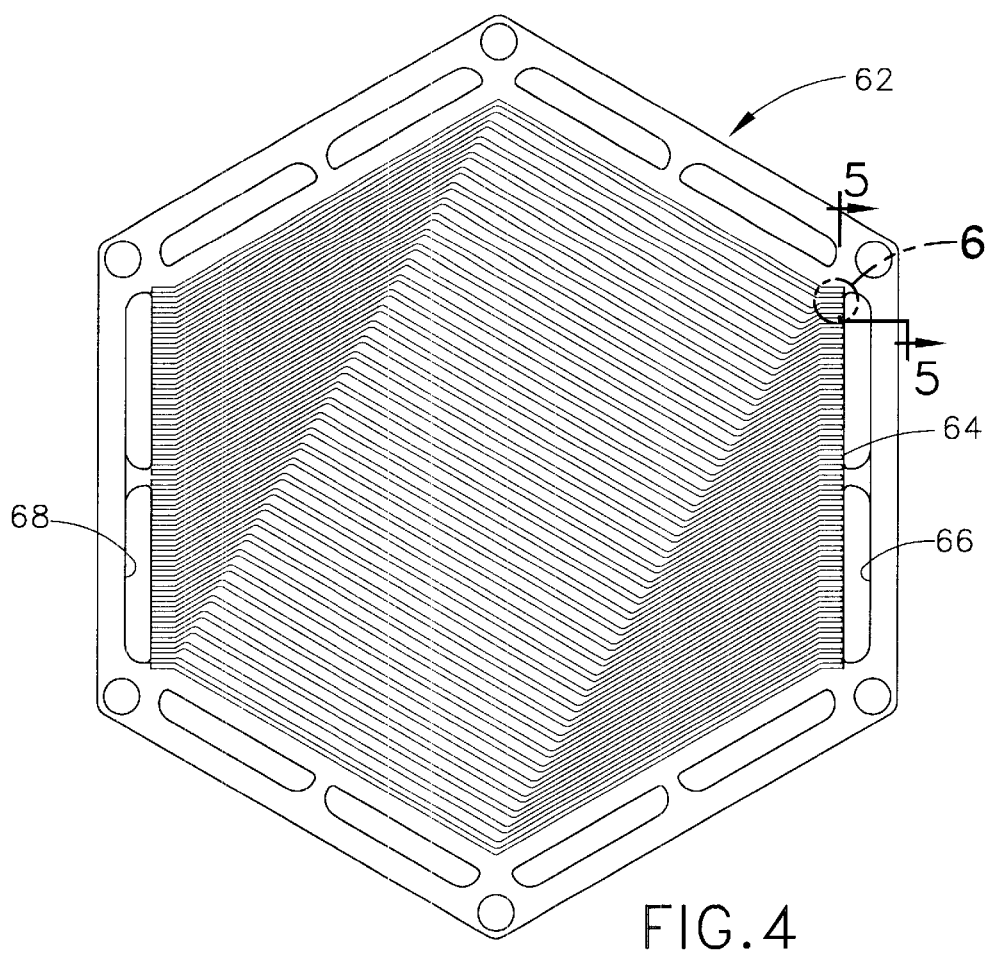
FIG. 4 is a plan view of a cathode plate in accordance with a preferred embodiment of a present invention.
Figure 5:
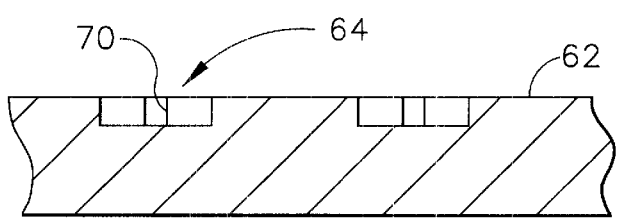
FIG. 5 is a partial section view taken along line 5—5 in FIG. 4.
Figure 6:
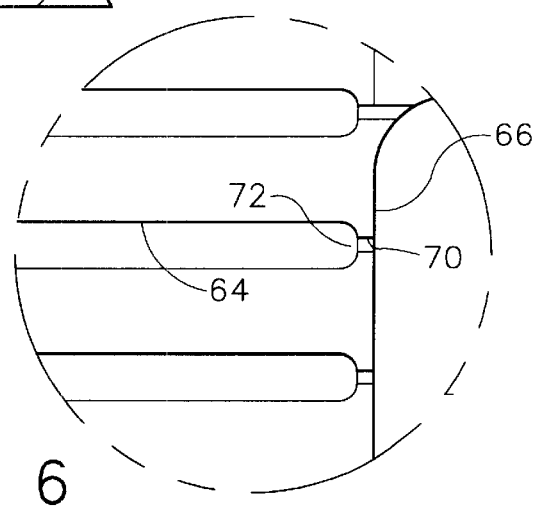
FIG. 6 is a an enlarged view of a portion of the bipolar plate assembly illustrated in FIG. 4.

With respect to materials and manufacture, the bipolar plate 12 and frame 14 illustrated in FIGS. 1–3 are preferably formed from aluminum, titanium, or steel and fabricated using hydroforming, coining, bending, stamping, or other common metal forming processes. The cathode plate 62 illustrated in FIGS. 4–6 is preferably formed from aluminum, titanium, steel, graphite, or conductive plastic and can be fabricated by machining, casting and molding processes. The surfaces of these components may be coated with a corrosion protective coating that is suitable for a PEM fuel cell environment such as gold, platinum, palladium, titanium nitride, or titanium aluminum nitride. These materials may be electrochemically deposited or vapor deposited. The tubes may be formed from metal, plastic or other suitable materials.

Although other configurations are within the scope of the present inventions, the exemplary bipolar plate assembly 10 illustrated in FIGS. 1–3 is configured as follows. The frame member 14 is about 10.3 inches in length and about 9.6 inches in width (not including the protrusions 56), while the bipolar plate 12 is about 8.0 inches in length and about 8.0 inches in width. There are 50 equally spaced oxidant channels 18 and 50 equally spaced fuel channels 24. The width of each channel is about 0.055 inch, the depth is about 0.02 inch and the thickness' of the ridges 20 and 26 are about 0.01 inch. Thus, the thickness of the illustrated bipolar plate 12 is about 0.03 inch. The side walls 28 are about 0.01 inch to about 0.03 inch thick and define an angle of about 100° with the bottom surface of the associated fuel or oxidant channel.

The exemplary cathode plate 62 illustrated in FIGS. 4–6 is hexagonal in shape that is about 2.0 inches in length on each side and about 0.40 inch thick. The width of the channels 64 is about 0.03 inch and the depth is about 0.01 inch to about 0.03 inch. The width of the constrictions 70 is about 0.008 inch and the depth is about 0.01 inch.

Figure 7:
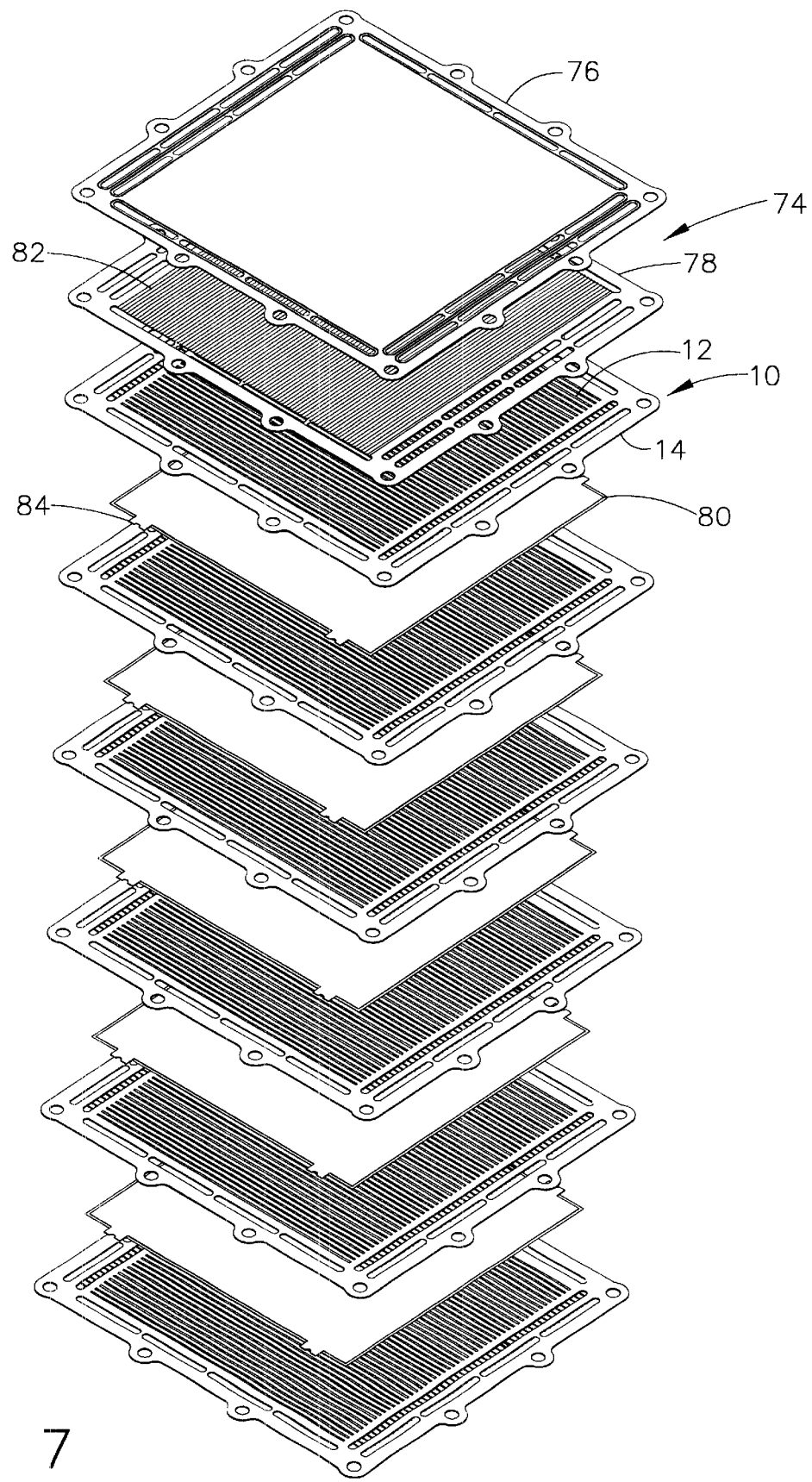
FIG. 7 is an exploded view of a fuel cell module in accordance with a preferred embodiment of a present invention.
Figure 8:
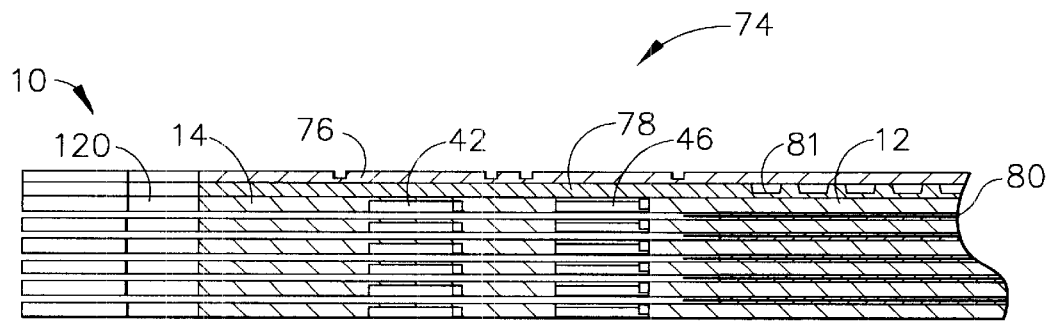
FIG. 8 is a partial section view of the fuel cell module illustrated in FIG. 7 in an assembled state.

The present bipolar plates may be incorporated into a variety of fuel cell devices. As illustrated for example in FIGS. 7 and 8, one use of the bipolar plate assembly 10 illustrated in FIGS. 1–3 is in a PEM fuel cell module 74. PEM fuel cell modules preferably consist of one to ten individual cells. In the exemplary embodiment illustrated in FIGS. 7 and 8, the fuel cell module 74 consists of five cells. More specifically, the exemplary fuel cell module 74 includes a separator plate 76, a coolant plate 78, six bipolar plate assemblies 10 (each including a bipolar plate 12 and a frame 14) and five MEAs 80 that are stacked in the manner shown. The bottom bipolar plate assembly 10 will typically rest upon the separator plate of an adjacent fuel cell module in a multi-module stack. In those instances where a particular module comprises the bottom module in a stack or is used in a one module stack, a bottom separator plate (not shown) may be provided below the bottom bipolar plate assembly 10.

The exemplary separator plate 76, which may be formed from materials such as aluminum, titanium, steel, graphite or conductive plastic, includes fuel manifolds, oxidant manifolds, coolant manifolds, and assembly apertures that correspond to those of the exemplary bipolar plate assembly 10. The exemplary coolant plate 78 also includes fuel manifolds, oxidant manifolds, coolant manifolds, and assembly apertures that correspond to those of the exemplary bipolar plate assembly 10. The coolant plate 78 is flat on one face and includes coolant channels 81 on the other face 82 that are in communication with the coolant manifolds 48 and 50. Suitable coolants include water, ethylene glycol, and polyalphaolefins.

Turning to the MEAs 80, the present inventions may be practiced with conventional MEAs. For example, the membrane electrolyte may be formed from perfluorinated sulfonic acid polymer sold under the name NAFION™ by E. I. DuPont de Nemours & Co. or Gore-Select™ by W. L. Gore. The anode and cathode films may be formed from catalytic particles in a NAFION™ or polytetrafluoroethylene binder. An appropriate material for the gas diffusion layer is ELAT™ by E-Tek and Carbel™ by W. L. Gore. In the illustrated embodiment, the MEAs 80 include tabs 84 that are used during the assembly process. Alternatively, commercial MEAs, such as those sold by W. L. Gore (Primea™), E-Tek and DeGussa-Huls, can be used.

Figure 9:
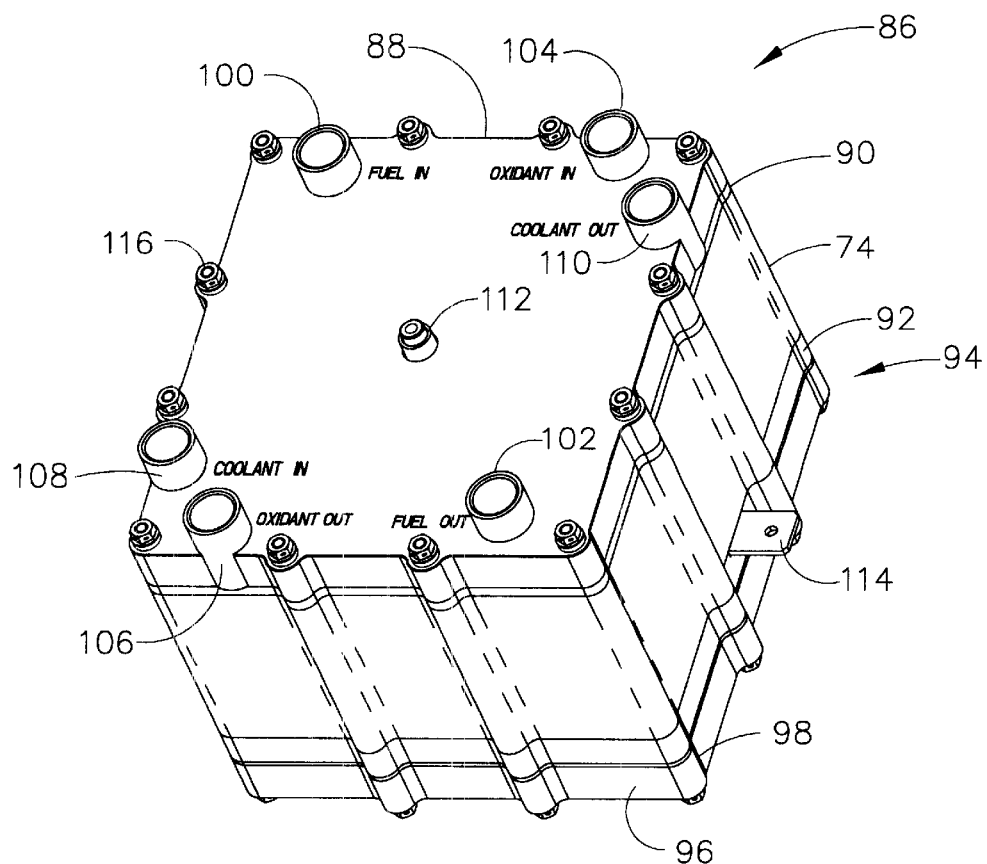
FIG. 9 is a perspective view of a fuel cell stack in accordance with a preferred embodiment of a present invention.

As shown by way of example in FIG. 9, a fuel cell stack 86 in accordance with a preferred embodiment of a present invention includes an end plate 88, a current collector 90, between one and two hundred fuel cell modules 74, a current collector 92 and an end plate assembly 94 that consists of an end plate 96 and a gasket 98. The end plate 88 is provided with fuel inlet and outlet ports 100 and 102, oxidant inlet and outlet ports 104 and 106 and coolant inlet and outlet ports 108 and 110. The ports connect sources of fuel, oxidant and coolant (not shown) to manifolds in the fuel cell modules 74. Here, the fuel is hydrogen and the oxidant is oxygen. The exemplary fuel cell stack 86 is also provided with a positive current collector terminal 112 and a negative current collector terminal 114. The various components may be secured to one another through the use of nut and bolt arrangements 116 or other mechanical fasteners. The bolts pass through a series of apertures 118 formed in protrusions 120 on the bipolar plate frame 14 and through apertures 122 in the corners of the frame (note FIG. 1), as well as through aligned apertures in the other components of the stack.

Although the present inventions have been described in terms of the preferred embodiment above, numerous modifications and/or additions to the above-described preferred embodiments would be readily apparent to one skilled in the art. For example, bipolar plates in accordance with a present invention may include flow restrictors associated with each of the channels on the cathode side and none on the anode side or, alternatively, may include flow restrictors associated with each of the channels on the anode side and none on the cathode side. It is intended that the scope of the present inventions extend to all such modifications and/or additions.

We claim:

1. A bipolar plate assembly for use in a fuel cell, comprising:
   a plurality of reactant channels defining respective inlets and outlets, the inlets of adjacent reactant channels being adjacent one another and the outlets of adjacent reactant channels being adjacent one another;
   a common reactant inlet manifold;
   a common reactant outlet manifold;
   at least two inlet connectors defining inlet connector flow areas respectively extending from at least two adjacent reactant channels to the common reactant inlet manifold and directly individually connecting the at least two adjacent reactant channels to the common reactant inlet manifold; and
   at least two outlet connectors respectively extending from the at least two adjacent reactant channels to the reactant outlet manifold, the outlet connectors defining outlet connector flow areas that are greater than the inlet connector flow areas.

2. A bipolar plate assembly as claimed in claim 1, wherein the outlet connector flow areas are approximately four times as large as the inlet connector flow areas.

3. A bipolar plate assembly, comprising:
   a first plurality of substantially linear reactant channels located on a first side of the bipolar plate defining respective inlets and outlets, the inlets of adjacent first reactant channels being adjacent one another and the outlets of adjacent first reactant channels being adjacent one another,
   a second plurality of substantially linear reactant channels defining respective inlets and outlets on a second side of the bipolar plate;
   first and second inlet manifolds respectively associated with the inlets of the first and second pluralities of substantially linear reactant channels;
   first and second outlet manifolds respectively associated with the outlets of the first and second pluralities of substantially linear reactant channels;
   a plurality of first inlet fluid connectors respectively associated with adjacent first reactant channels and extending from the first inlet manifold to the inlets of the first reactant channels and defining respective first inlet flow areas;
   a plurality of second inlet fluid connectors extending from the second inlet manifold to the inlets of the second reactant channels and defining respective second inlet flow areas;
   a plurality of first fluid outlet connectors extending from the outlets of the first reactant channels to the first outlet manifold and defining respective first outlet flow areas that are greater than the first inlet flow areas; and
   a plurality of second fluid outlet connectors extending from outlets of the second reactant channels to the second outlet manifolds and defining respective second outlet flow areas that are greater than the second inlet flow areas.

4. A fuel cell, comprising:
   at least two membrane electrode assemblies; and
   a bipolar plate assembly between the membrane electrode assemblies, the bipolar plate assembly including
      a plurality of reactant channels defining respective inlets and outlets, the inlets of adjacent reactant channels being adjacent one another and the outlets of adjacent reactant channels being adjacent one another,
      a common reactant inlet manifold,
      a common reactant outlet manifold,
      at least two inlet connectors defining inlet connector flow areas respectively extending from at least two adjacent reactant channels to the common reactant inlet manifold directly individually connecting the at least two adjacent reactant channels to the common reactant inlet manifold, and
      at least two outlet connectors respectively extending from the at least two adjacent reactant channels to the reactant outlet manifold, the outlet connectors defining outlet connector flow areas that are greater than the inlet connector flow areas.

5. A fuel cell as claimed in claim 4, wherein the outlet connector flow areas are approximately four times as large as the inlet connector flow areas.

* * * * *